United States Patent [19]

Morooka

[11] Patent Number: 4,815,920

[45] Date of Patent: Mar. 28, 1989

[54] LOCK NUT WITH SYNTHETIC RESIN THREADING

[75] Inventor: Takuya Morooka, Kodaira, Japan

[73] Assignee: Bridgestone Corporation, Tokyo, Japan

[21] Appl. No.: 86,394

[22] Filed: Aug. 17, 1987

[30] Foreign Application Priority Data

Aug. 22, 1986 [JP] Japan .............................. 61-196714
Apr. 17, 1987 [JP] Japan .............................. 62-94941

[51] Int. Cl.$^4$ ...................... F16B 37/14; F16B 39/22
[52] U.S. Cl. ................................. 411/431; 411/377; 411/301; 10/86 C
[58] Field of Search .................. 411/301–303, 411/429–431, 371–377, 324, 947; 10/86 C, 86 A, 86 R

[56] References Cited

U.S. PATENT DOCUMENTS

| | | | |
|---|---|---|---|
| 3,239,036 | 3/1966 | Scott | 411/542 |
| 3,520,342 | 7/1970 | Scheffer | 411/303 |
| 4,235,147 | 11/1980 | Weidner, Jr. | 411/542 |
| 4,316,690 | 2/1982 | Voller | 411/377 |
| 4,397,437 | 8/1983 | Madej | 411/431 |
| 4,452,556 | 6/1984 | Nelson et al. | 411/377 |

Primary Examiner—Neill R. Wilson
Attorney, Agent, or Firm—Parkhurst, Oliff & Berridge

[57] ABSTRACT

A lock nut of the present invention comprises a metal nut base body and a synthetic resin portion, an internally threaded portion having a diameter smaller than that of an internally threaded portion of the nut base body and extending therefrom being formed in a cap-like portion formed at one end of the nut base body. This lock nut can prevent the occurrence of looseness after the lock nut has been fastened.

20 Claims, 2 Drawing Sheets

LOCK NUT WITH SYNTHETIC RESIN THREADING

BACKGROUND OF THE INVENTION

The present invention relates to a taper lock nut which is mainly used for wheels, and particularly to a lock nut in which a metal nut base is surrounded by a synthetic resin.

Nuts made of aluminum or steel are conveniently used as taper lock nuts for the wheels of automobiles.

However, all of such nuts easily experience looseness and are heavy, and steel-made nuts have a problem with respect to rust. In addition, although there has been a recent demand for these nuts to be made fashionable and to be colored, it has been difficult to color conventional nuts.

SUMMARY OF THE INVENTION

Considering the above-described problems of conventional nuts, it is an object of the present invention to obtain a nut which can prevent both the occurrence of looseness after being tightened and the generation of rust, and which is light, and it is another object to provide a lock nut which enables color coordination.

To this end, the present invention provides a lock nut comprising a metal nut base body having an outer periphery on which a taper is formed from an intermediate portion toward one end in the axial direction thereof; a synthetic resin portion which covers the periphery with the exception of the internally threaded portion of the nut base body and forms a cap-like portion capable of covering the other portion of the nut base body, and in which a portion capable of being engaged with a rotating tool is formed on the outer surface of the cap-like portion and an internally threaded portion that extends from the internally threaded portion of the nut base body and having a diameter smaller than that of the latter is formed in the cap-like portion; and a means which is provided on the outer periphery of the nut base body and which strengthens the interlocking connection with the synthetic resin portion. The synthetic resin portion having a diameter which is smaller than that of the nut base body can thus be tightly screwed onto a bolt and hence is capable of preventing the occurrence of looseness.

A nut provided in accordance with the present invention which has an outer shape with which a rotating tool such as a spanner or a (torque) wrench can be engaged and which generally has a hexagonal or dodecagonal shape is provided with a taper on the tightening side so as to conform with the bearing surface of a wheel. The internally threaded portions of the nut base body and the synthetic resin portion are continuously formed and the thread portion of the latter has a diameter which is smaller than that of the former. This internally threaded portion is formed by setting an internal thread core for forming internal threads into a mold and by employing the thermal shrinkage of a synthetic resin to provide a slightly smaller diameter.

This dimensional relationship means that the ratios of actual lengths $H_1$ and $H_2$ of the internally threaded portions in the nut body and the synthetic resin to the externally threaded portion of the bolt onto which the nut is screwed are 20 to 95% and 40 to 100%, respectively, relative to the height $H_0$ of the threads of the externally threaded portion of the bolt, and that $H_2 > H_1$. For example, when a M12 bolt is used, the ratio for $H_2$ is preferably 0.4 to 1.4 mm (42 to 100% of the height $H_0$ of the threads), more preferably 0.7 to 1.2 mm (74 to 100% of the height $H_0$ of the threads), this being based on a strength, resistance to looseness, and the need to provide a good engagement between nut and bolt.

Therefore, when the nut is produced, the dimension of the core is so determined that the dimension of the resin internally threaded portion is within the range described above. In other words, when the nut is produced, the major diameters of the nut base body and the bolt core may be made larger than that of the bolt by 0.05 to 0.8 mm and 0.02 to 0.7 mm, respectively, and the core may be unscrewed from the nut base body after a resin has been charged into the mold, whereby the above-described dimension can be obtained by virtue of the thermal shrinkage of the resin.

In the present invention, it is possible to form on the inner surface of the synthetic resin portion the internally threaded portion extending from the internally threaded portion of the nut base body and also to form thin grooves in the internally threaded portion of the former.

In this case, when the bolt is screwed into the nut, the nut is gradually received in a hole having an inverse tape with which the tapered portion of the nut engages during the screwing action. Since, as described above, the tapered portion is made of a synthetic resin and one or a plurality of thin grooves are formed in the synthetic resin portion in the direction of progress of the bolt or at an angle of inclination therefrom, the tapered portion of the synthetic resin portion is pressed by the tapered portion of the hole and thus is easily deformed toward the bolt side. Therefore, after fastening, the tapered portion of the synthetic resin portion is brought into extremely tight press-contact with the bolt, leading to complete prevention of any possibility of looseness occurring.

It is preferable that the nut base body be made of iron, aluminum, or stainless steel, and that the outer periphery thereof has a polygonal shape, such as a square or hexagon. If the outer periphery has a circular shape, it is required that unevenness is formed on the surface by a knurling process from the viewpoint of providing a strong engagement with the synthetic resin.

On the other hand, examples of synthetic resin that may be used for covering such a metal nut include nylon, polyesters, polysulfones, polyether imides, polycarbonates, polyether sulfones, polyacetals, polyphenylene sulfide, polyphenylene oxide, polyether ether ketones, polyamide imides, and polyoxybenzylene, and the kind of the resin should be selected in consideration of its strength. In some cases, glass fibers, carbon fibers, or ceramic fibers may be mixed with the resin selected as means of reinforcement. In addition, the outer surface of the nut comprising synthetic resin facilitates the provision of coloring with various colors. Since the outer surface has no metal portion, there is no occurrence of rust.

BRIEF DESCRIPTION OF THE DRAWINGS

The accompanying drawings illustrate the preferred embodiments of the present invention. In the drawings, the same reference numerals illustrate the same parts of the invention, in which.

Figure 1:
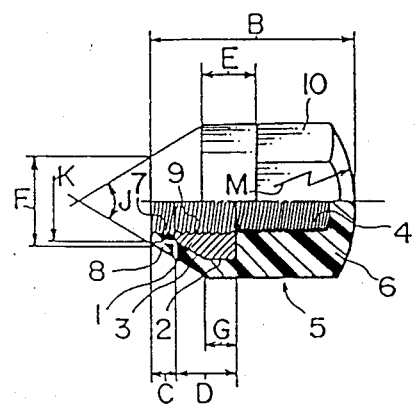
FIG. 1 is a partially-cut away side view of a tapered lock nut for wheels of a first embodiment of the present invention.
Figure 2:
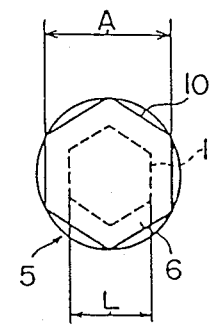
FIG. 2 is a right side view of the same.

DESCRIPTION OF THE PREFERRED EMBODIMENTS:

FIG. 1 is a partially-cut away view of a taper lock nut for wheels of an embodiment of the present invention and FIG. 2 is a rear view of the same. In this embodiment, a nut base body 1 is made of steel and an outer periphery 2 has a hexagonal shape with a tapered portion 3 on one side thereof. A cap-like portion 6 which covers the nut base body 1 and has an internal thread 4 extending therefrom is formed on the rear side thereof from a synthetic resin 5 to form an entire lock nut.

In this embodiment, a nylon resin is used and the reisn moves to the front side of the nut base body 1 to form an internal thread 7. A portion 8 formed by the resin at this forward portion serves as a structure which is necessary to prevent the nut base body 1 from being separated. The internal thread 4 is formed such as to have a diameter which is smaller than that of the internal thread 9 of the nut base body 1. The outer periphery 10 of the cap-like portion 6 in which the internal thread 4 is formed has a regular hexagonal shape and allows for engagement with the tool used for tightening.

A general manufacturing method is one in which the outer thread core is screwed into the nut base body, they are set in a mold, a synthetic resin is then cast into the mold by injection, and the core is finally unscrewed from the nut body.

(Experimental Example)

The result of a looseness test carried out on the nut of the present invention is described below. This test was directed to examining axial force after a body to be fastened had been fastened with an axial force of 1.5 tons and sine wave vibrations at a frequency of 1000 and with an amplitude of ±1.0 m/m has been applied to the body in a direction perpendicular to the axial direction of the bolt and nut.

The nut base body 1 used in this experimental example had an internal thread 9 (M 12×1.25), in which a dimension D is 11.4 mm; a dimension G, 7 mm; a dimension K, 14.2 mm; a dimension L, 17 mm; a dimension A of the synthetic resin 5, 21 mm; a dimension B, 34 mm; a dimension C, 3.5 mm; a dimension E, 14 mm; a dimension F, 14.5 mm; an angle J, 60 degrees; and a dimension M, 25 mm.

The result of this test is shown in Table 1. It can be seen from the table that the lock nut of the present invention exhibits a small tendency to become loose as compared with conventional metal nuts and a very high degree of retention of the axial force.

In addition, looseness tests were performed on various lock nuts by using a high-speed loosenes tester (produced by Hard Lock Industry Co.). The vibration stroke was 11 m/m and the frequency of vibration was 1780 rpm (29.3 Hz).

The results of the measurement of times taken before the nuts became loose are shown in Table 2.

Figure 3:
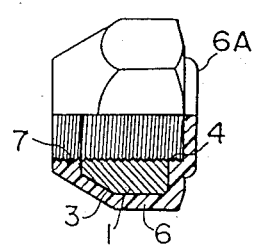
FIG. 3 is a partially-cut away side view of a tapered lock nut of a second embodiment of the present invention relates.
Figure 4:
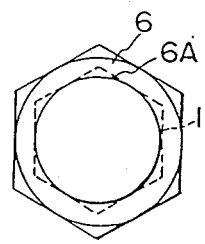
FIG. 4 is a right side view of the same.

FIGS. 3 and 4 show a lock nut of a second embodiment to which the present invention relates. The lock nut of this embodiment has a resin cap-like portion having an hexagonal outer periphery which provides for engagement with a tightening tool during fastening.

The cap-like portion 6 has a short portion projecting backwardly from the nut base body 1 and an internal thread 4 provided in the cap-like portion 6 is closed by a disk portion 6A which is integrally connected with the cap-like portion.

The other configurations are the same as those of the first embodiment and have the same function and effect.

TABLE 1

|   |           | Embodiment | Comparison Example | | |
|---|-----------|------------|---------------------|---|---|
|   |           |            | SUS304-made | Ti-made | SS41-made |
| A | $Q_2$ (ton)   | 0.93       | 0.05        | 0       | 0.35      |
| B | $Q_2/Q_0$ (%) | 62         | 3           | 0 (Bolt was broken) | 23        |

A: Axial forces after application of vibrations.
B: Retention of the axial forces relative to the force at tightening (1.5 tons).

TABLE 2

|  | | Fastening torque | Measurement |
|---|---|---|---|
| Embodiment | Lock nut covered with nylon | 400 kg cm | 30 minutes or more |
| Comparison Example | Steel-made nut | 400 kg cm | 20 seconds |

Figure 5:
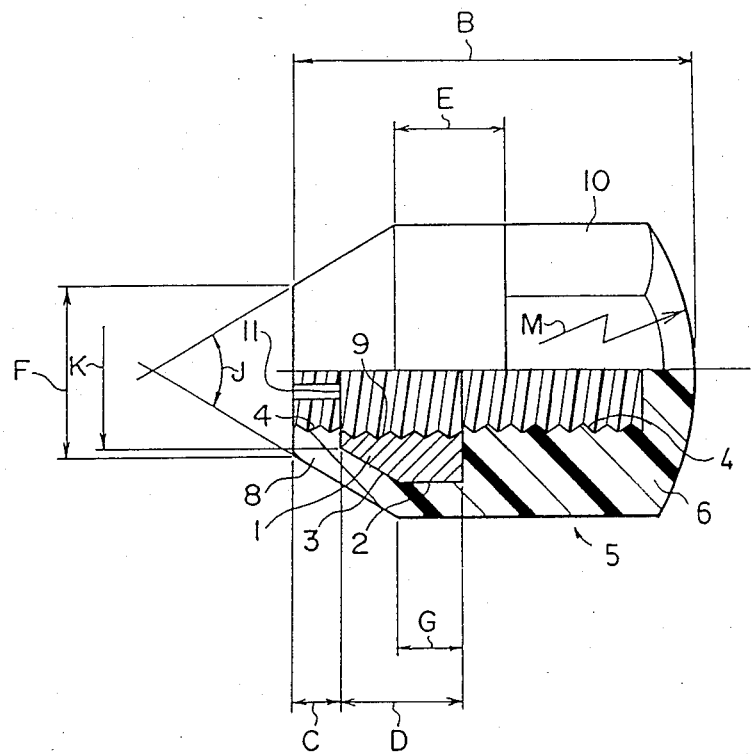
FIG. 5 is a partially-cut away side view of a tapered lock nut of a third embodiment of the present invention.
Figure 6:
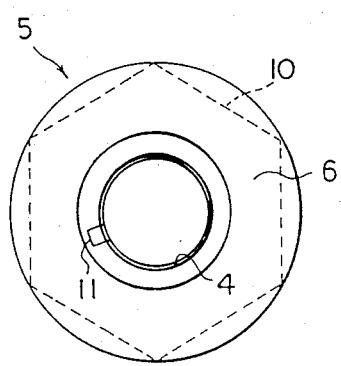
FIG. 6 is a side view of the same.

FIGS. 5 and 6 show a third embodiment of the present invention. A nut base body 1 is made of steel and an outer periphery 2 has a hexagonal shape with a tapered portion 3 on one side thereof. A nylon resin which covers the nut base body 1 moves to the front side (taper side) thereof to form an internal thread 4. In addition, a cap-like portion 7 which is made of a synthetic resin 6 and has an internal thread 5 extending from the nut base body 1 is formed on the rear side thereof to form an entire lock nut.

A portion 8 formed by the resin at this forward portion serves as a structure which is necessary to prevent the nut base body 1 from being separated. Each of the internal threads 4 and 5 are formed such as to have a diameter which is smaller than that of the internal thread 9 of the nut base body 1. The outer periphery 10 of the cap-like portion in which the internal thread 5 is formed has a regular hexagonal shape and allows for engagement with a tool used for tightening.

Figure 7:
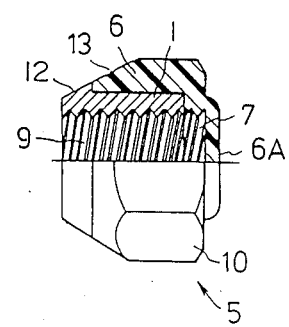
FIG. 7 is a fourth embodiment of the present invention.

FIG. 7 shows a fourth embodiment of the present invention in which part of the outer surface of a taper 4 is directly formed by an inclined surface 12 of a metal nut base body 1. In this embodiment, the nut base body 1 has a cylindrical shape and is provided with unevenness which is formed on the surface that is brought into contact with a synthetic resin portion 2 by a knurling process. In addition, although in this embodiment a cap-like portion 10 is formed, it is a matter of course that an opening 8 may be alternatively provided on the nut base body 1, as shown in FIG. 1.

(Effect of the Invention)

The lock nut of the present invention exhibits a high capability to prevent looseness as compared with the steel-made nut as well as excellent characteristics in respect of coloring, prevention of rust, and lighter weight.

What is claimed is:

1. A lock nut comprising:
   a metal nut base body having, an outer periphery on which a taper is formed from an intermediate portion toward one end in the axial direction thereof, and an internally threaded portion; and
   a synthetic resin portion which covers said periphery with the exception of said internally threaded portion of said nut base body and forms a cap-like portion so as to cover the other portion of said nut base body, and in which a portion for engagement with a rotating tool is formed on the outer surface of said cap-like portion, having an internally threaded portion extending from said internally threaded portion of said nut base body and having a diameter smaller than that of the latter formed in said cap-like portion whereby an interference fit is provided between the lock nut and a fastener.

2. The lock nut according to claim 1, wherein said synthetic resin portion has a taper along said taper of said nut base body.

3. The lock nut according to claim 1 wherein said means for strengthening said interlocking connection involves a polygonal shape formed in said outer periphery of said nut base body.

4. The lock nut according to claim 1 wherein said means for strengthening said interlocking connection involves an uneven portion formed on said outer periphery of said nut base body.

5. The lock nut according to claim 1, wherein said portion engaged with said rotating tool has a polygonal shape.

6. The lock nut according to claim 1 further comprising means provided on said outer periphery of said nut base body for strengthening the interlocking connection with said synthetic resin portion.

7. A taper lock nut comprising:
   a metal nut base body having, an outer periphery on which a taper is formed toward one end, and an internally threaded portion; and
   a synthetic resin portion which covers said periphery with the exception of said internally threaded portion of said nut base body and forms a tape along said taper of said nut base body and a cap-like portion so as to cover the other portion of said nut base body, and in which the outer surface of said cap-like portion is formed into a polygonal shape with which a rotating tool can be engaged, having an internally threaded portion extending from said internally threaded portion of said nut base body and having a diameter smaller than that of the latter formed in said cap-like portion, whereby an interference fit is provided between the lock nut and a fastener.

8. The lock nut according to claim 1, wherein said means for strengthening said interlocking connection involves an uneven portion formed on said outer periphery of said nut base body.

9. The lock nut according to claim 1, wherein said means for strengthening said interlocking connection involves a polygonal shape formed on said outer periphery of said nut base body.

10. The lock nut according to claim 7, wherein the ratios of actual length $H_1$ of said internally threaded portion in said nut base body and actual length $H_2$ of said synthetic resin portion are set to be 20 to 90% and 40 to 100%, respectively, relative to a height $H_0$ of the external thread of a bolt onto which said nut body is screwed, and said length $H_2$ is greater than the other length $H_1$.

11. The lock nut according to claim 7 further comprising means provided on said outer periphery of said nut base body for strengthening the interlocking connection with said synthetic resin portion.

12. A taper lock nut comprising:
   a metal nut base body having, an outer periphery on which a taper is formed toward one end, and an internally threaded portion;
   a synthetic resin portion which covers said periphery with the exception of said internally threaded portion of said nut base body and forms a taper along said taper of said nut base body and a cap-like portion so as to cover the other portion of said nut base body, and in which a portion for engagement with a rotating tool is formed on the outer surface of said cap-like portion, and having an internally threaded portion extending from said internally threaded portion of said nut base body and having a diameter smaller than that of said internally threaded portion of said nut base body formed in said cap-like portion; and
   thin grooves formed in the internally threaded portion on the inner surface of said synthetic resin portion.

13. The lock nut according to claim 12, further comprising means provided on said outer periphery of said nut base body for strengthening the interlocking connection with said synthetic resin portion.

14. The lock nut according to claim 13, wherein said means for strengthening said interlocking connection involves an uneven portion on said outer periphery of said nut base body.

15. The lock nut according to claim 13, wherein said means for strengthening said interlocking connection involves a polygonal shape formed in said outer periphery of said nut base body.

16. The lock nut according to claim 12, wherein said portion engaged with said rotating tool has a polygonal shape.

17. A taper lock nut comprising:
   a metal nut base body having, an outer periphery on which a taper is formed toward one end, and an internally threaded portion, said taper providing part of an inclined surface of said lock nut; and
   a synthetic resin portion which covers a portion of said periphery with the exception of said internally threaded portion of said nut base body, said synthetic resin portion forming a cap-like portion so as to cover the other portion of said nut base body, and in which a portion for engagement with a rotating tool is formed on the outer surface of said cap-like portion, having an internally threaded portion extending from said internally threaded portion of said nut base body and having a diameter formed in said cap-like portion which is smaller than a diameter of said internally threaded portion of said nut base body.

18. The lock nut according to claim 17, further comprising means provided on part of said outer periphery of said nut base body for strengthening the interlocking connection with said synthetic resin portion.

19. The lock nut according to claim 18, wherein said means for strengthening said interlocking connection involves an uneven portion formed on part of said outer periphery of said nut base body.

20. A lock nut according to claim 17, wherein said portion engaged with said rotating tool has a polygonal shape.

* * * * *